United States Patent [19]
Greber

[11] 3,739,814
[45] June 19, 1973

[54] LAMINAR FLOW WALL ATTACHMENT FLUID LOGIC DEVICE

[75] Inventor: Isaac Greber, Shaker Heights, Ohio

[73] Assignee: Bell Telephone Laboratories, Incorporated, Murray Hill, N.J.

[22] Filed: July 8, 1971

[21] Appl. No.: 160,864

[52] U.S. Cl. ............................................. 137/81.5
[51] Int. Cl. ............................................. F15c 1/18
[58] Field of Search .................................... 137/81.5

[56] References Cited
UNITED STATES PATENTS

| | | | |
|---|---|---|---|
| 3,378,023 | 4/1968 | Beeken | 137/81.5 |
| 3,362,421 | 1/1968 | Schaffer | 137/81.5 |
| 3,182,674 | 5/1965 | Horton | 137/81.5 |
| 3,212,515 | 10/1965 | Zisfein et al. | 137/81.5 |
| 3,396,619 | 8/1968 | Bowles et al. | 137/81.5 X |
| 3,396,738 | 8/1968 | Heskestad | 137/81.5 X |
| 3,467,121 | 9/1969 | Bowles | 137/81.5 |
| 3,509,897 | 5/1970 | Abler | 137/81.5 |
| 3,550,607 | 12/1970 | Sarpkaya | 137/81.5 |

*Primary Examiner*—Samuel Scott
*Attorney*—W. L. Keefauver

[57] ABSTRACT

A wall attachment fluidic device operating in the laminar flow range is disclosed. Either bistable or monostable devices can be produced, provided the attachment wall associated with each stable state conforms to a particular shape. That particular shape is one in which the radius of curvature K of the attachment wall is initially substantially equal to $x^{1/2}$, where $x$ is a nondimensional distance measured along the arc of the wall for the power jet inlet. The radius of curvature K gradually increases until it reaches $x^{3/4}$. Thereafter, it remains equal to $x^{3/4}$ until the jet receiver is reached.

7 Claims, 6 Drawing Figures

3,739,814

INVENTOR
*I. GREBER*
BY
*Harry Newman*
ATTORNEY

Patented June 19, 1973 3,739,814

LAMINAR FLOW WALL ATTACHMENT FLUID LOGIC DEVICE

BACKGROUND OF THE INVENTION

This invention relates to wall attachment fluidic devices and more particularly to a device operating in the laminar flow range.

The attachment of a fluid jet to an adjacent wall is an application of the Coanda effect. This relies on turbulent flow, that is, flow where the Reynolds number exceeds some critical value. The Reynolds number is a nondimensional quantity equal to $(\rho v d/\mu)$ where $\rho$ is the fluid density, $v$ is the fluid velocity, $d$ is the width of the flow orifice, and $\mu$ is the fluid viscosity. Since $\rho$ and $\mu$ are essentially constant for a given fluid, the value of vd must be considered by device designers to ensure flow in the turbulent range. In a simple device, the velocity $v$ is essentially a function of its pressure. Therefore, to obtain turbulent flow, a proper combination of operating pressure and orifice size must be preserved.

This becomes a particular problem when it is desired to miniaturize the fluidic devices. Since the value of $d$ is decreased by miniaturization, the fluid velocity must be correspondingly increased. This can be done either by raising the fluid pressure, which requires a greater power input and related problems, or else turbulence generating devices must be introduced to generate turbulence at lower Reynolds number. Yet, ironically, the introducing of turbulence generating devices takes space, and, since size reduction is the reason for miniaturization, that is a somewhat self-defeating solution to the problem.

The ideal solution would be to design a wall attachment device that does not require turbulence to maintain jet wall attachment, namely, a device operating in the laminar flow range. If the device operates in the laminar flow range, a high Reynolds number need not be maintained. Therefore, despite the reduction in the size of the orifice due to miniaturization, the fluid velocity and pressure need not be changed. Thus, no further power input is required, yet the device performs as reliably as it did before being miniaturized.

In the A1AA Journal of July 1968, Vol. 6, No. 7, at page 1,331, I described a theoretical solution to the mathematical model of this problem. By use of a similarity solution, I showed, together with my co-author Bruce Lindow, that a laminar, incompressible jet would attach to a curved wall of a particular shape. Based upon an assumption of zero initial mass flow and infinite momentum flow, we showed that the radius of curvature K of the wall must equal $x^{-3/4}$ where $x$ is a nondimensional length of arc along the attachment surface. Since only an infinitesimally thin jet would possess a zero mass flow and infinite momentum flow, the practical application of that discovery was impossible.

A real jet requires a different solution. Initially, the jet grows as a boundary layer, and only far downstream does it behave as if the jet were initially infinitesimally thin. Therefore, although the theoretical thesis is true downstream, some adjustment must be made in the vicinity of the jet origin to produce a workable device.

SUMMARY OF THE INVENTION

Wall attachment of a laminar flow jet can be attained and maintained in a fluidic logic device if the attachment wall has an initial curvature equal to the distance from the jet origin along the arc of the wall raised to the one-half power, and if the radius of curvature is gradually increased to equal the distance along the arc of the wall raised to the three-fourths power.

DESCRIPTION OF THE ILLUSTRATIVE EMBODIMENTS

Figure 1:
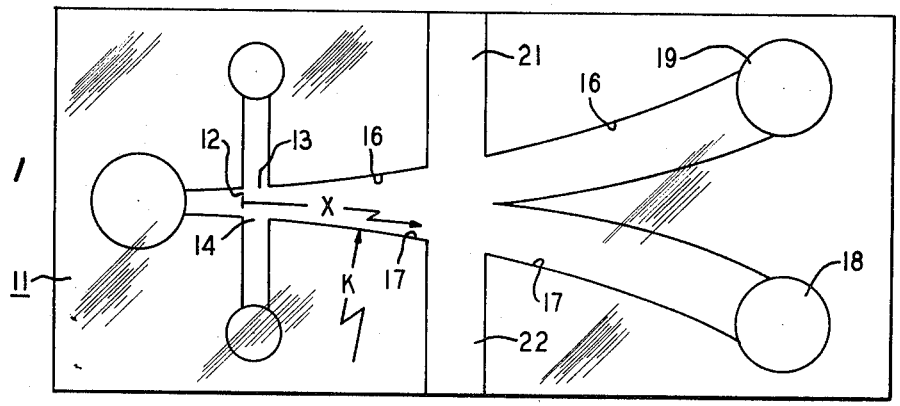
FIG. 1 shows a bistable logic device embodying my invention.

In the interest of clarity, the devices shown in the drawing have transparent covers. It should be understood that these devices may be constructed from any of the usual materials used for fluidic devices. It is simply felt that the embodiments are more clearly depicted if the internal configuration can be shown without the possibly confusing presence of cross-section lines.

A bistable device 11 is shown in FIG. 1 and includes a power inlet 12, a set control port 13, a clear control port 14, intermediate attachment walls 16 and 17, vents 21 and 22, a "0" output receiver port 18, and a "1" output receiver port 19. The device is symmetrical about its horizontal axis and both attachment walls 16 and 17 have the same shape. The radius of curvature K of attachment walls 16 and 17 is initially equal to $x^{1/2}$, where $x$ is equal to the nondimensional length of arc measured along the wall from inlet 12. The radius of curvature gradually increases until it reaches $x^{3/4}$, after which it continues to vary as $x^{3/4}$ until the receiver ports 18 and 19 are reached.

Figure 2:
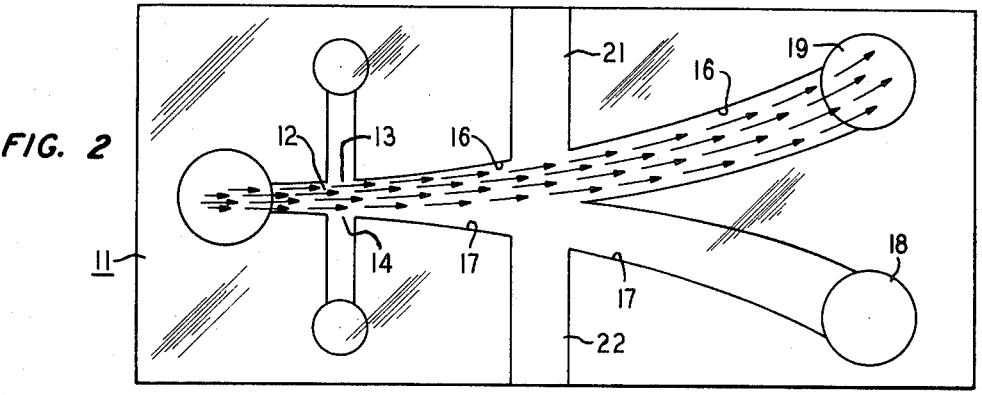
FIG. 2 shows the device of FIG. 1 showing the flow pattern in a first stable state.

If we assume that the device is initially in the stable position shown in FIG. 2, the power jet is attached to wall 16 and the "0" output, receiver port 19, is active. Any influence of loading or back pressure are relieved by vents 21 and 22.

Figure 3:
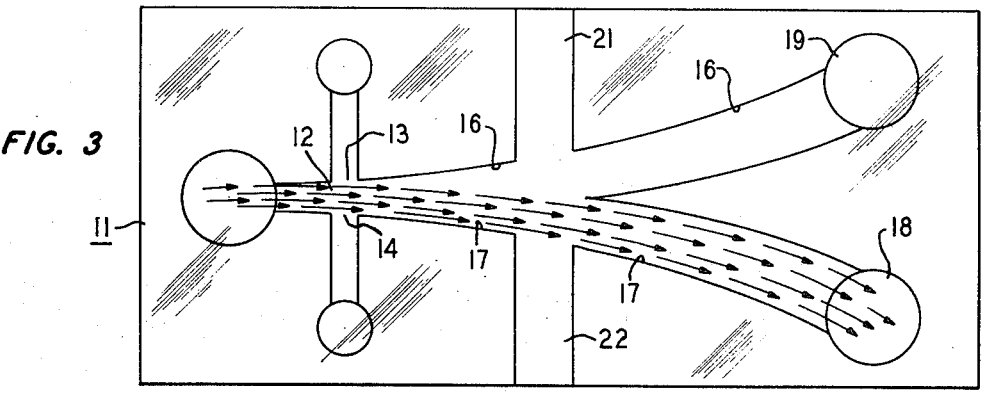
FIG. 3 shows the device of FIG. 1 showing the flow pattern in the second stable state.

To "set" the device, that is, to make the "1" output receiver port 18 active, a short fluid pulse must issue from control port 13. This introduces a separation between the jet and sidewall 16, breaks the wall attachment to sidewall 16, and causes the laminar jet to switch or transfer to the second stable position, shown in FIG. 3, where the jet attaches to wall 17. Since this jet position is stable, the jet will remain attached to wall 17 to be delivered to receiver port 18, thereby giving a "1" output.

To "reset" or "clear" the device, and return the jet to the position shown in FIG. 2, a short fluid pulse must issue from control port 14. Separation will be caused, interrupting the attachment of the jet to wall 17 and transferring the jet instead to wall 16.

Since both the "0" and "1" positions are stable, only a short fluid pulse must issue from control ports 13 and 14, although longer pulses would not be deleterious to the device's performance.

Figure 4:
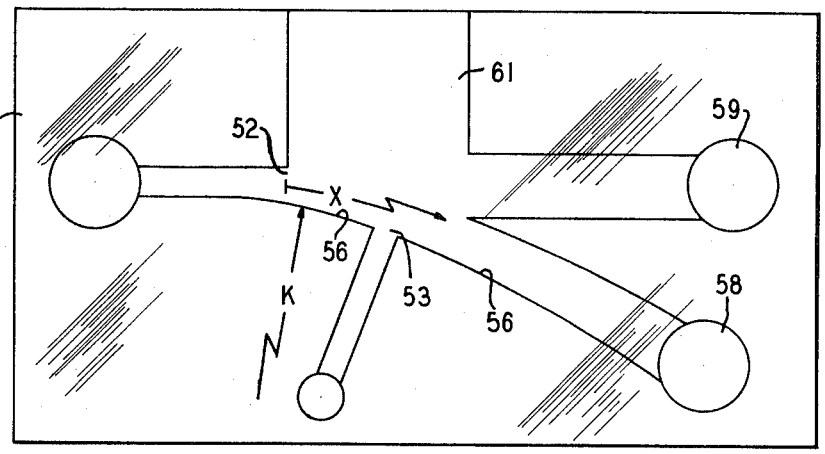
FIG. 4 shows a monostable logic device embodying my invention.

A monostable device may also be constructed to embody my invention. FIG. 4 shows such a monostable device 51 which includes a power inlet 52, a control port 53, an attachment wall 56, a stable output receiver port 58, an unstable output receiver port 59 and a vent 61. As with the attachment wall of the bistable device, the radius of curvature K of attachment wall 56 is initially equal to $x^{1/2}$, where $x$ is equal to the nondimensional length of arc measured along the wall from inlet 52. The radius of curvature gradually increases until it reaches $x^{3/4}$, after which it continues to vary as $x^{3/4}$ until receiver 58 is reached.

Figure 5:
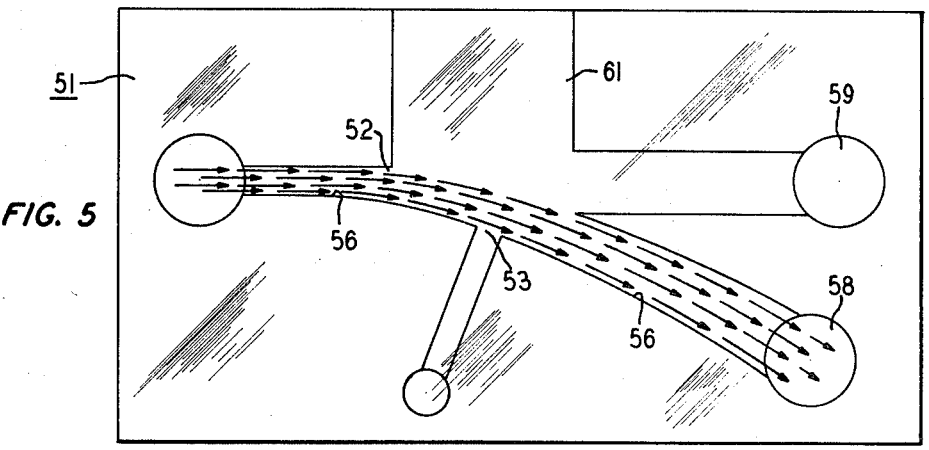
FIG. 5 shows the device of FIG. 4 showing the flow pattern in its stable state.

The jet flow pattern for the device in its stable state is shown in FIG. 5. The laminar power jet issues from inlet 52 and attaches to wall 56 which delivers it to the stable output, receiver 58.

Figure 6:
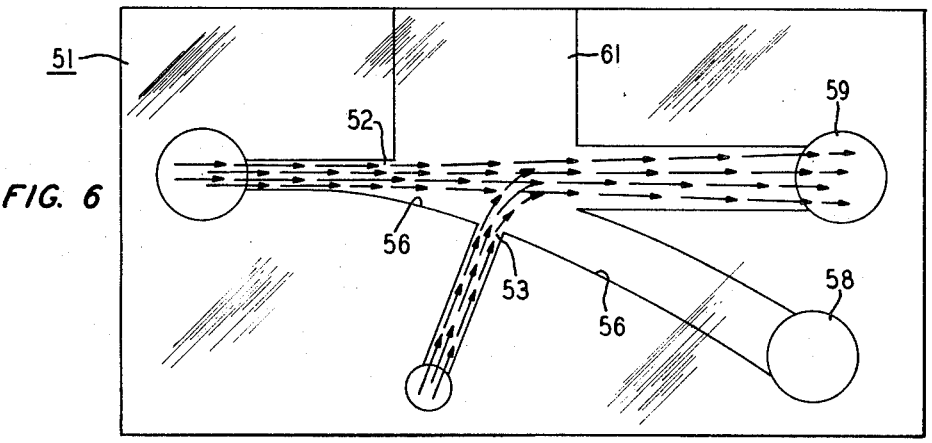
FIG. 6 shows the device of FIG. 4 showing the flow pattern in its unstable state.

To switch device 51 and activate the unstable output, receiver 59, a control jet must issue from control port 53 as shown in FIG. 6. The action of the control jet results in a deflection of the main power jet. A separation between wall 56 and the main jet occurs, breaking the wall attachment existing between the jet and wall 56. The result of the deflection of the main jet by the control jet is a single combined jet at a new direction. This resultant jet is received by the unstable output, receiver 59.

Since the device is unstable in this position, an output will be received by receiver 59 only as long as a control jet issues from port 53. As soon as the control jet terminates, the device will again assume its stable state as shown in FIG. 5, with the main jet attached to wall 56 to be delivered to receiver 58. Vent 61 acts to prevent any interference with proper operation due to back pressure or loading of the outputs.

It should, of course, be apparent to those skilled in the art that other logic devices embodying the principles of my invention may be designed. No attempt has been made to show a comprehensive family of logic elements, but simply to display two representative devices that embody the invention.

What is claimed is:

1. A laminar flow fluidic device comprising
   means for generating a power jet having laminar flow;
   a curved wall located adjacent the generating means, the radius of curvature $K$ of the wall gradually increasing from $K = x^{1/2}$ at the generating means to $K = x^{3/4}$ at the termination of the wall, where $x$ is the distance from the generating means measured along the arc of the curved wall;
   the shape of the curved wall being effective to cause the generated laminar jet to attach to the curved wall; and
   a receiver located adjacent the termination of the wall for issuing a fluidic signal when flow from the attached laminar jet is present at the receiver.

2. A device in accordance with claim 1 further including
   a control port having its axis transverse to that of the generating means for generating a control jet to selectively impinge upon the generated jet thereby displacing the generated laminar jet from its position of attachment to the curved wall.

3. A device in accordance with claim 2 further including
   a second receiver located near the axis of the displaced jet for issuing a fluidic signal, distinct from the other fluidic signal, when flow from the displaced laminar jet is present at the second receiver.

4. A device in accordance with claim 1 further including
   a second curved wall to which the generated laminar jet may attach located adjacent the generating means but on the opposite side thereof from the other wall, the profile of the second wall being essentially a mirror image of the other wall so that the two walls are symmetrical about the generating means;
   a second receiver located adjacent the termination of the second wall for issuing a fluidic signal, distinct from the other fluidic signal, when flow from the attached laminar jet is present at the second receiver; and
   means for selectively determining the wall to which the generated laminar jet attaches.

5. A device in accordance with claim 4 wherein the means for selectively determining the wall to which the generated laminar jet attaches comprises
   a first control port having its axis transverse to that of the generating means for generating a first control jet to impinge upon the generated laminar jet thereby placing the generated laminar jet in position to attach to the second wall; and
   a second control jet having its axis transverse to that of the generating means for generating a second control jet to impinge upon the generated laminar jet thereby placing the generated laminar jet in position to attach to the other wall.

6. A laminar flow monostable fluidic logic device comprising
   a source for generating a laminar flow fluid power jet;
   a curved wall adjacent the source to which the generated laminar jet attaches in a stable position, the radius of curvature K of the wall gradually increasing from $K = x^{1/2}$ at the source to $K = x^{3/4}$ at the termination of the wall, where $x$ is the distance from the source measured along the arc of the curved wall;
   a first jet receiver positioned to receive the jet attached to the wall for issuing a fluidic signal indicative of the stable state of the device when the attached laminar jet is present at the first receiver;
   a control port located transverse to the axis of the generated laminar jet for selectively generating a control signal jet, the generation of the control jet being effective to interrupt the attachment of the laminar power jet to the wall and to displace the laminar power jet from its stable position; and
   a second jet receiver positioned to receive the displaced laminar jet and to issue a fluidic signal indicative of the unstable state of the device when the control jet is generated and the displaced laminar jet is present at the second receiver.

7. A laminar flow bistable fluidic logic device comprising
   a source of generating a laminar flow fluid power jet;
   a first curved wall adjacent the source to which the generated laminar jet may attach in a first stable position, the radius of curvature K of the first wall gradually increasing from $K = x^{1/2}$ at the source to $K = x^{3/4}$ at the termination of the first wall, where $x$ is the distance from the source measured along the arc of the curved wall;
   a first jet receiver positioned to receive the jet attached to the first wall for issuing a fluidic signal indicative of the first stable state when the attached laminar jet is present at the first receiver;

a second curved wall adjacent to the source to which the generated laminar jet may attach in a second stable position, the second wall having a profile which is the minor image of the first wall and being positioned opposite from the first wall so that the first and second walls are essentially symmetrical about the source;

a second jet receiver positioned to receive the laminar jet attached to the second wall for issuing a fluidic signal indicative of the second stable state when the attached laminar jet is present at the second receiver;

a first control port, located through the second wall with its axis transverse to the laminar power jet, for selectively generating a first control jet to impinge upon the laminar jet attached to the second wall and interrupt that attachment thereby switching the laminar power jet to a position where it attaches to the first wall; and a second control port, located through the first wall with its axis transverse to the laminar power jet, for selectively generating a second control jet to impinge upon the laminar jet attached to the first wall and interrupt that attachment thereby switching the laminar power jet to a position where it attaches to the second wall.

* * * * *